United States Patent [19]
Ishigaki et al.
[11] 3,806,667
[45] Apr. 23, 1974

[54] FOUR CHANNEL PHONOGRAPH MULTIPLEX RECORDING SYSTEM WITH SIGNAL LEVEL CONTROL

[75] Inventors: Yukinobu Ishigaki, Yamato; Kohei Sasamura, Sagamihara, both of Japan

[73] Assignee: Victor Company of Japan, Ltd., Kanagawa-ken, Japan

[22] Filed: Dec. 29, 1971

[21] Appl. No.: 213,306

[30] Foreign Application Priority Data

| | | |
|---|---|---|
| Dec. 31, 1970 | Japan | 45-128371 |
| Dec. 31, 1970 | Japan | 45-128372 |
| Dec. 31, 1970 | Japan | 45-128373 |
| Dec. 31, 1970 | Japan | 45-138683[U] |

[52] U.S. Cl. .................. 179/100.4 ST, 179/1 GQ, 179/100.4 M, 179/100.4 C

[51] Int. Cl. .......................... G11b 3/00, G11b 3/74

[58] Field of Search.......... 179/100.1 TD, 100.4 ST, 179/100.4 C, 100.4 D, 15 BT, 1 GQ

[56] References Cited

UNITED STATES PATENTS

| | | | |
|---|---|---|---|
| 3,632,886 | 1/1972 | Scheiber | 179/100.4 ST |
| 2,759,049 | 8/1956 | Scott | 179/100.4 D |
| 3,401,237 | 9/1968 | Takayanagi | 179/100.4 ST |
| 3,067,292 | 12/1962 | Minter | 179/100.4 ST |

*Primary Examiner*—Raymond F. Cardillo, Jr.

[57] ABSTRACT

A four channel recording system starts with a pre-recorded magnetic tape which is played back by two reproducing heads. A first head is used to detect the output signal level read from the tape. The output from the other head is then controlled responsive to the detected level. Thereafter, the controlled signal is recorded on a phonograph record at signal levels set responsive to the output of the first head.

11 Claims, 29 Drawing Figures

INVENTORS
YUKINOBU ISHIGAKI
KOHEI SASAMURA
BY Louis Bernat
ATTY.

INVENTORS
YUKINOBU ISHIGAKI
KOHEI SASAMURA
BY Louis Bernat
ATTY.

INVENTORS
YUKINOBU ISHIGAKI
KOHEI SASAMURA
BY Louis Bernat
ATTY.

INVENTORS
YUKINOBU ISHIGAKI
BY KOHEI SASAMURA
Louis Bernat
ATTY.

INVENTORS
YUKINOBU ISHIGAKI
KOHEI SASAMURA
BY Louis Bernat
ATTY.

INVENTORS
YUKINOBU ISHIGAKI
KOHEI SASAMURA
BY Louis Bernat
ATTY.

INVENTORS
YUKINOBU ISHIGAKI
KOHEI SASAMURA
BY Louis Bernat
ATTY.

INVENTORS
YUKINOBU ISHIGAKI
KOHEI SASAMURA
BY Louis Bernat
ATTY.

FOUR CHANNEL PHONOGRAPH MULTIPLEX RECORDING SYSTEM WITH SIGNAL LEVEL CONTROL

This invention relates to a system for recording multiplex channel signals on a record disc and, more particularly, to a system in which the level of an angle modulated signal is controlled in response to the level of a direct wave signal.

The copending United States patent application Ser. No. 92,803 filed Nov. 25, 1970, entitled "System For Recording And/Or Reproducing Four Channel Signals ON A Record Disc", now U.S. Pat. No. 3,686,471, issued Aug. 22, 1972, shows a system for recording four channel signals on two walls of a single sound groove by making a sum signal and a difference signal from each two channels. Angle modulated difference signal are superimposed upon the direct wave sum signal for recording them on one wall of the sound groove.

In this proposed recording system for a four channel record, the output level of the angle modulated wave signal is maintained constant, irrespective of the level of the direct wave signal, during cutting and recording. The above described recording system, however, has now been found to have the following problems. (1) When the direct wave signal is at a low level, a modulated wave signal is cut and recorded at an unnecessarily high level. As a result, a superfluous cutter current flows, and the heating of the cutter increases. In order to cool off this heat, a special type of gas cooling means must be employed. This inevitability makes the apparatus large and expensive. (2) The level of the angle modulated wave signal should preferably be limited to the minimum, from the standpoints of compatibility with a conventional two channel record and resistance to wear of the record. However, a mere reduction in the level of the angle modulated wave signal increases a disturbing noise. Accordingly, such a mere reduction is not a proper approach to the problem.

The applicant, therefore, further proposed, in our copending United States patent application, Ser. No. 155,575 filed June 26, 1971, entitled "System For Cutting And Recording On A Record Disc," a system in which the level of the carrier of the angle modulated wave, is controlled in response to the level of the direct wave signal. According to the above proposed system, the above described problems can be effectively overcome.

In the above proposed system, however, a signal reproduced from a magnetic tape is rectified and discriminated in a level discrimination circuit, so as to obtain a voltage level control signal. In this system, a time constant circuit is provided in a circuit after a rectifying circuit in order to avoid interference of a noise modulation. In this proposed system, the control signal is a signal having a voltage waveform which rises with a time constant and falls with a time constant, immediately thereafter. Accordingly, there is no problem in case a high level reproduced signal is used for obtaining a control signal, provided that it is continuously supplied in the form of a signal having a time width which is greater than the time constant of the time constant circuit. However, in case the high level reproduced signal is supplied in the form of a signal having a time width which is less than the time constant of the time constant circuit, a problem arises since the level of the carrier of the angle modulated wave can not be controlled at a desired set level by this control signal. Further, there is a problem since the rising and falling times of the control signal current, supplied to the control circuit, do not become coincidental due to the AC waveforms controlled responsive to the various levels which appear after passing the time constant circuit.

It is, therefore, a general object of the invention to provide a novel and usefull improved system for recording multiplex channel signals on a record disc in which the problems of the above proposed system have been overcome.

Another object of the invention is to provide a system in which a control signal corresponding to this level is obtained, when the level of the direct wave signal increases above a predetermined level. The level of the carrier of the angle modulated wave is controlled by this control signal during recording and cutting on the disc. This control signal comprises a signal which has a voltage waveform having a gradual rising and falling, with a relatively large time constant, and having a continuing time covering a time portion which is longer than the predetermined level of the direct wave signal. A record disc on which a signal is recorded is capable of reproducing the signal without producing a distortion or a noise with a large signal to noise ratio. Further, noise demodulation does not occur during the reproducing of this record disc since the rising and falling of the envelope of the controlled portion of the carrier are gradual.

A further object of the invention is to provide a system using a control signal for controlling the level of the carrier of the angle modulated wave. The control signal has a voltage waveform which rises gradually before the portion to be controlled. It continues for at least a period of time corresponding to the portion to be controlled, and then it falls gradually.

A still further object of the invention is to provide a system in which the level of the carrier of the angle modulated wave is controlled in a plurality of steps in response to the level of the direct wave signal. Thus, the level of the carrier is controlled in strict response to the level of the direct wave signal.

Other objects and features of the present invention will become apparent from the description made hereinbelow with reference to the accompanying drawings, in which:

FIG.1 is a block diagram showing a first embodiment of the system according to the invention;

FIGS.2(A) to (E) are diagrams, each showing a waveform of a signal in each block shown in FIG.1;

Figure 3:
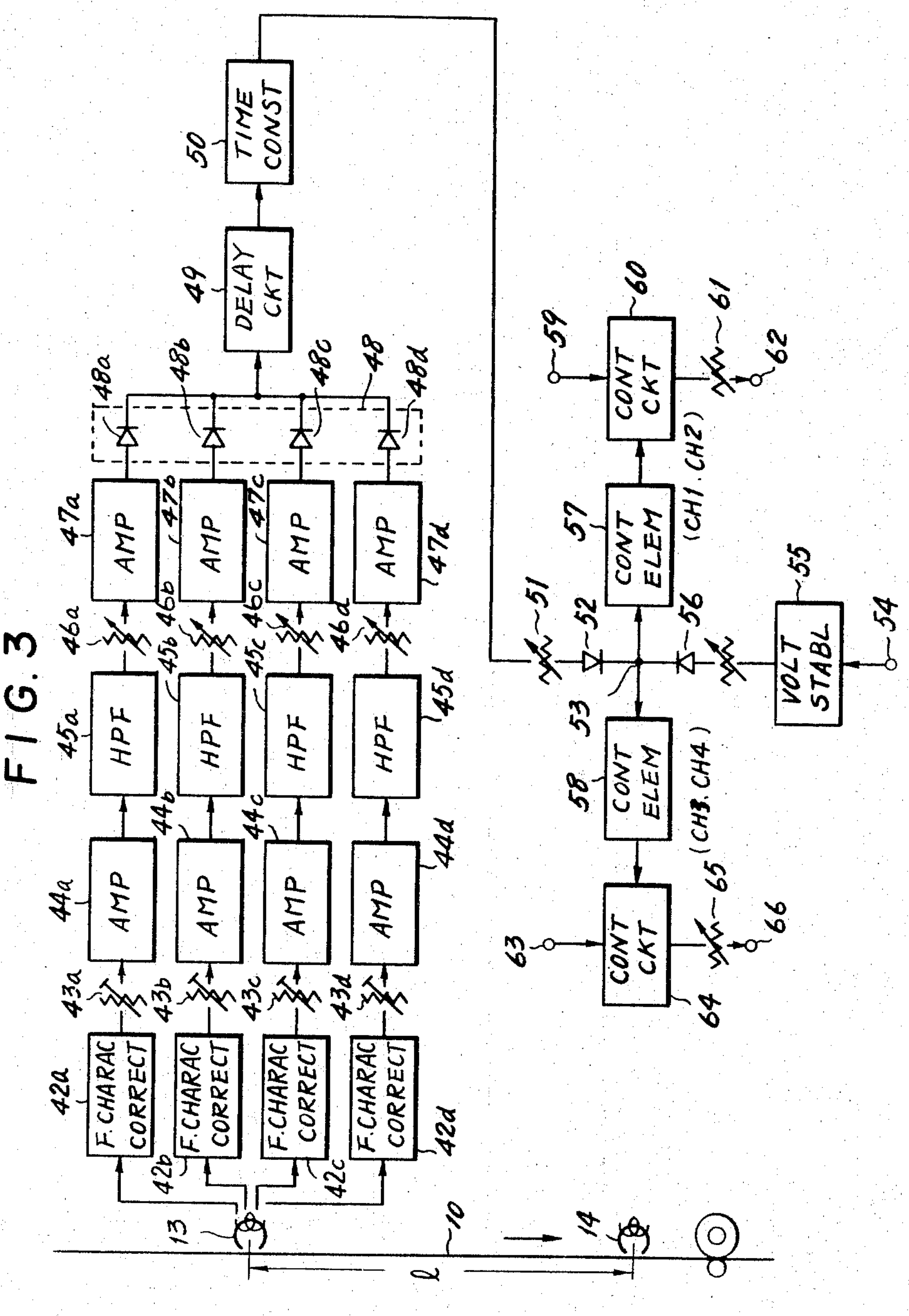
FIG. 3 is a block diagram showing a second embodiment of the system according to the invention.
Figures 7, 8:
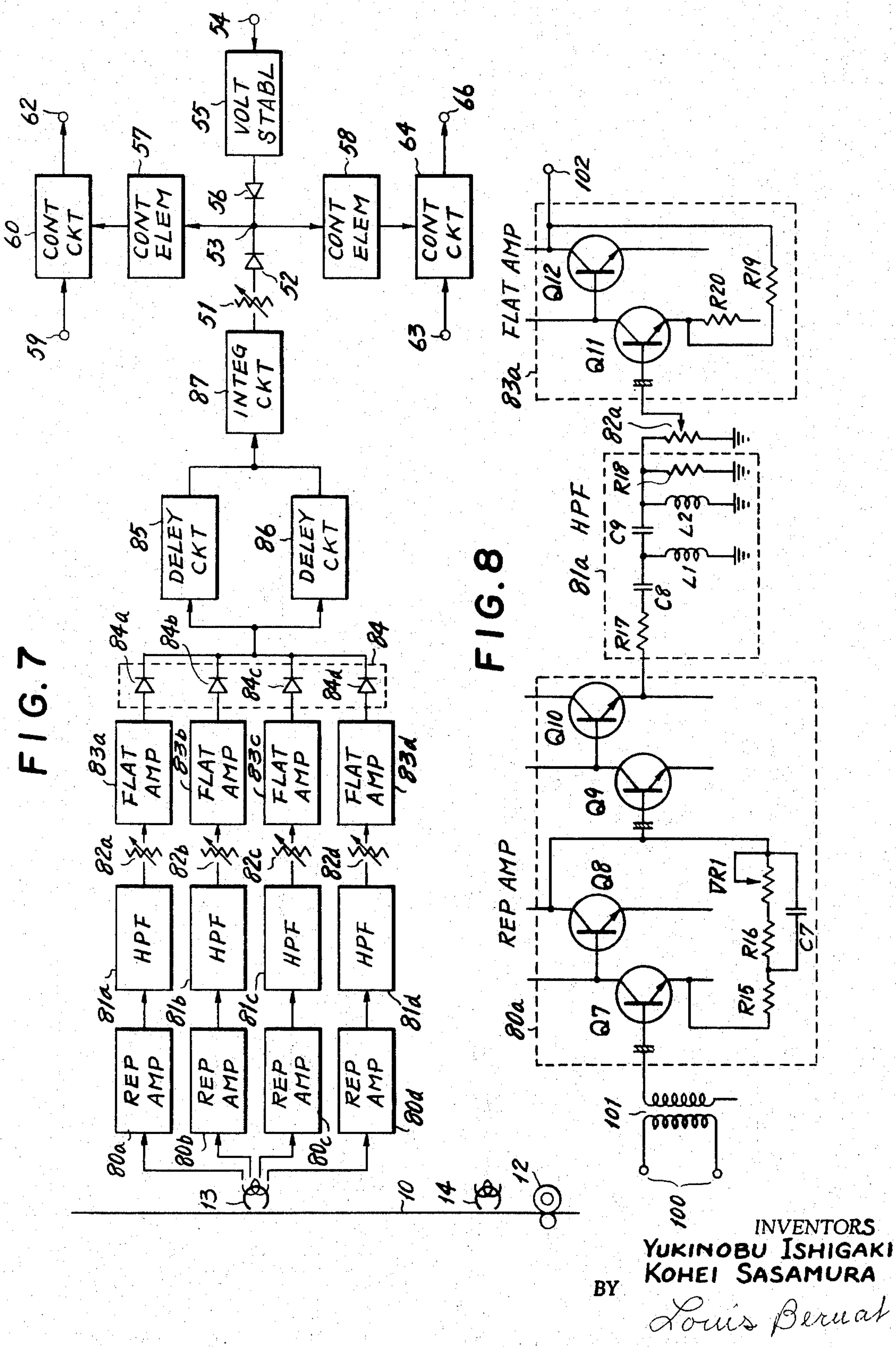
Figure 9:
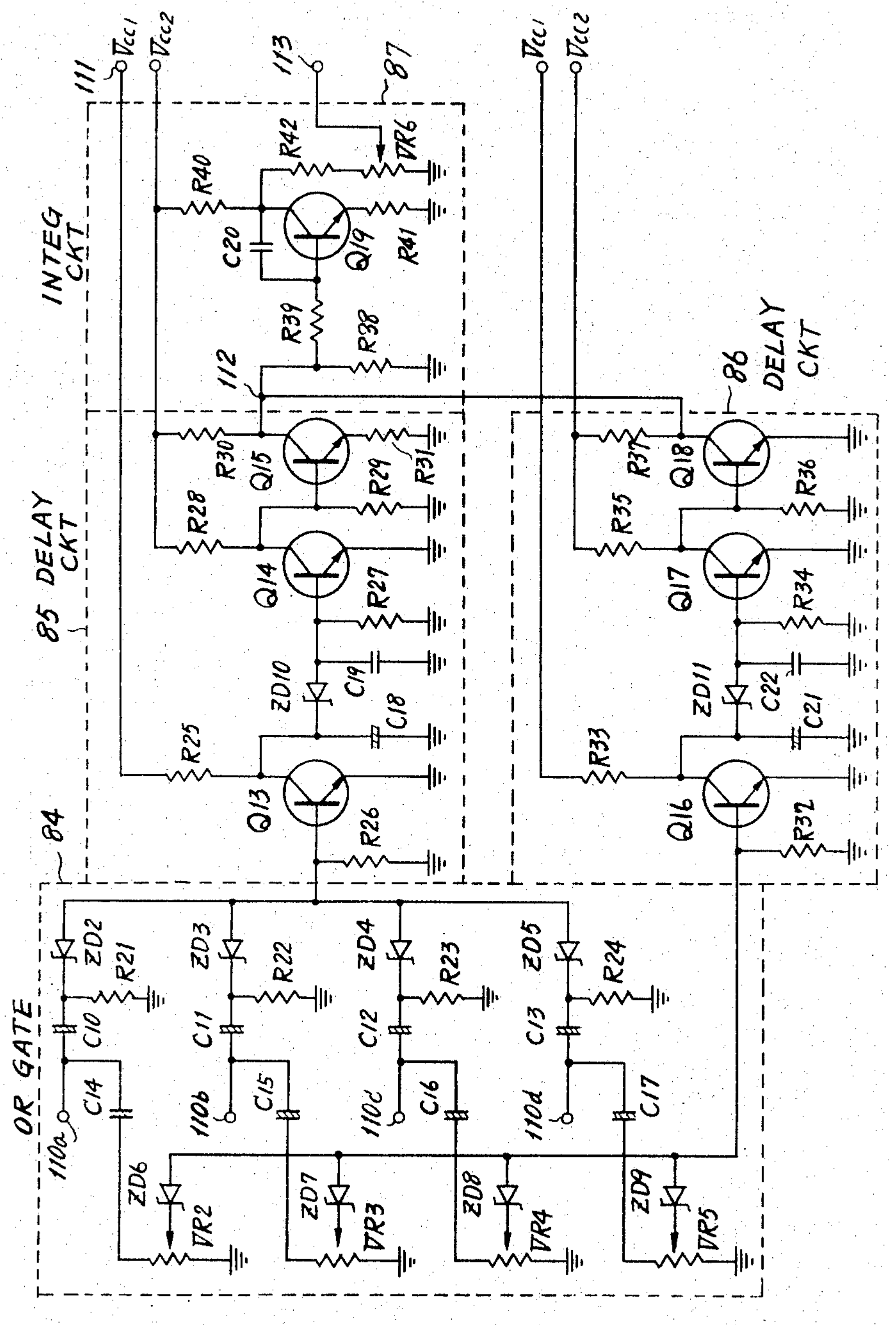
Figure 10:
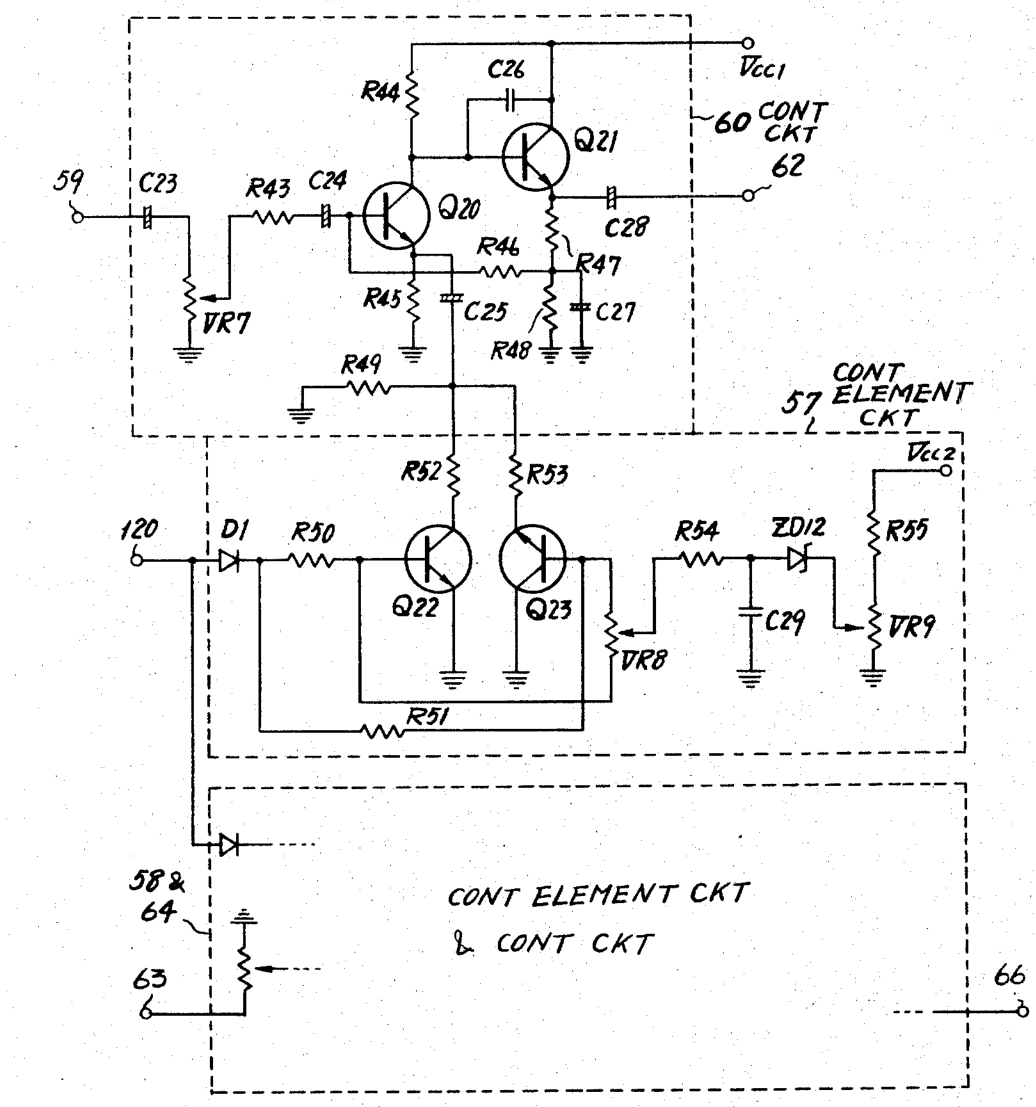
Figure 11:
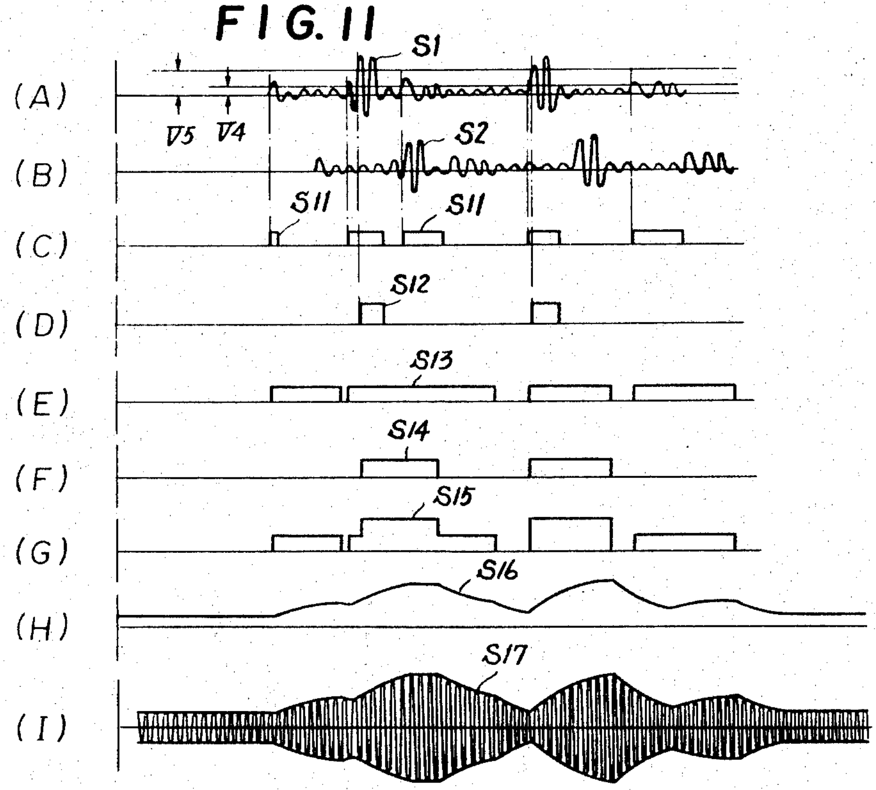
Figure 12:
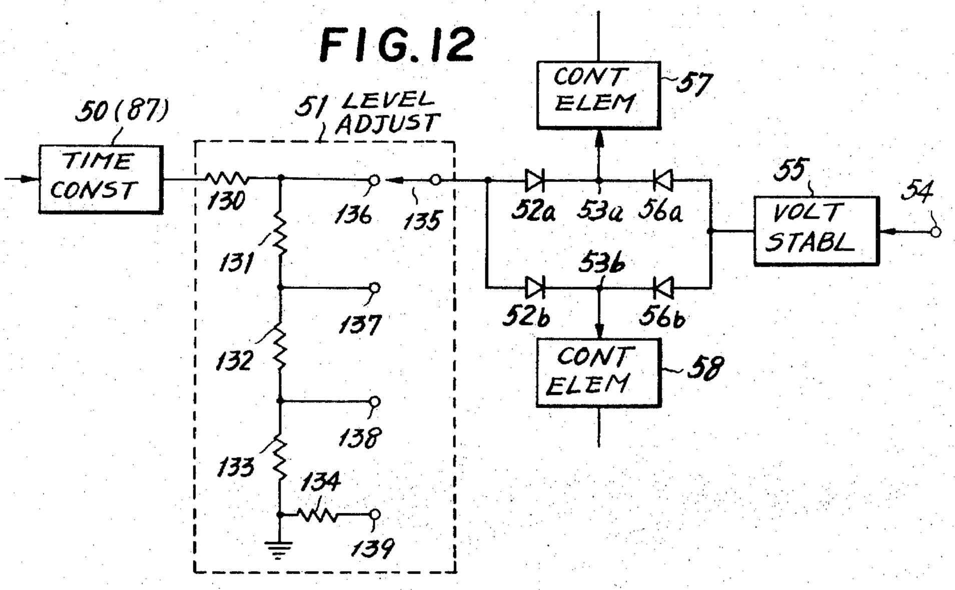

FIGS.6(A) to (F) are diagrams, each showing a waveform in each block shown in FIG.3;

FIG.7 is a block diagram showing a third embodiment of the system according to the invention;

FIGS.8 to 10 are respectively circuit diagrams showing embodiments of electric circuits used as the essential parts of the block diagram shown in FIG.7;

FIGS.11 (A) to (I) are diagrams each showing a waveform of a signal shown in each block shown in FIG.7; and FIG. 12 is a circuit diagram of one embodiment of the control signal level adjuster and circuits annexed thereto.

The first embodiment of the system according to the invention will be described with reference to FIGS. 1 and 2.

Figure 1:
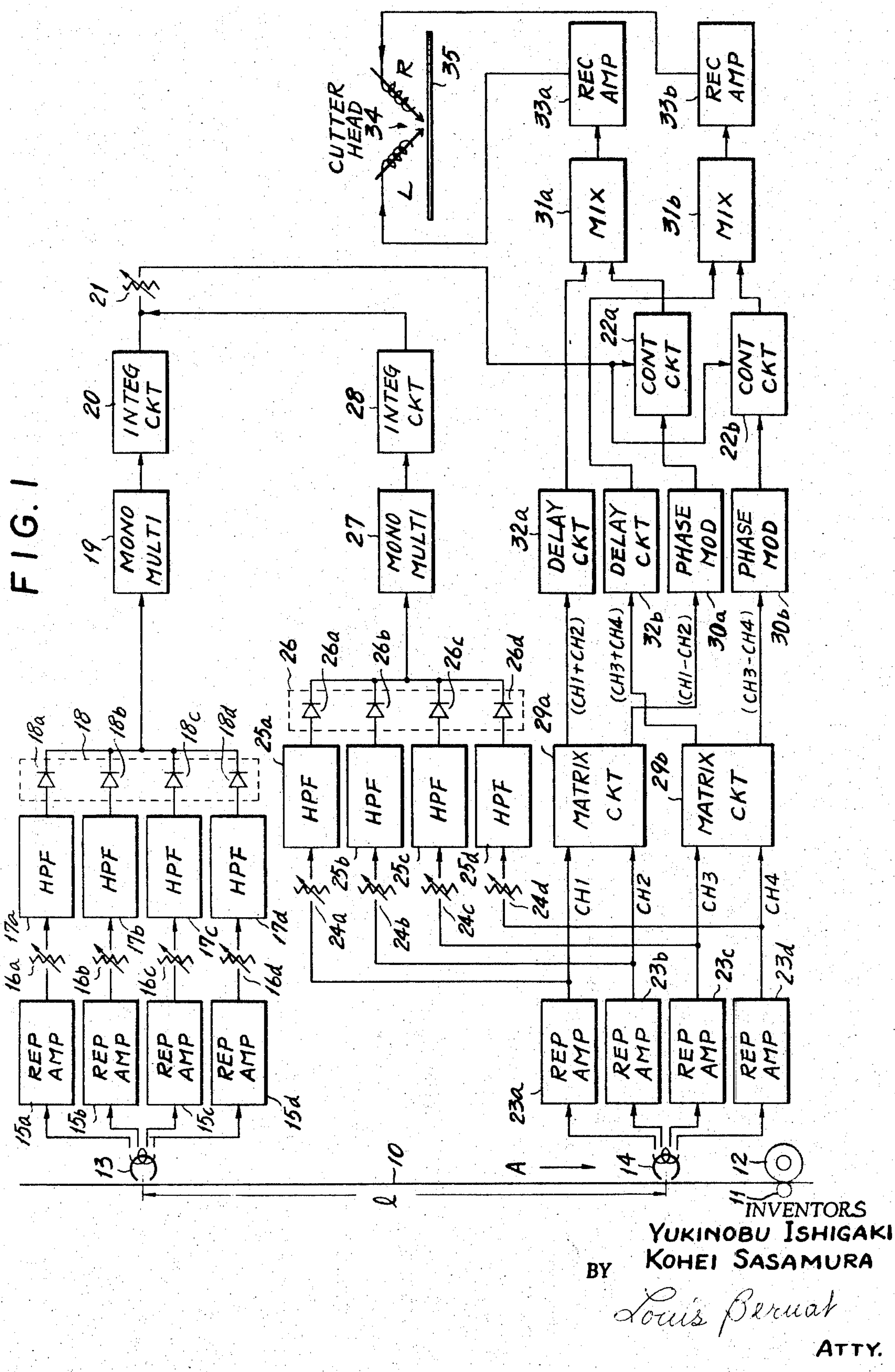
Figure 2:
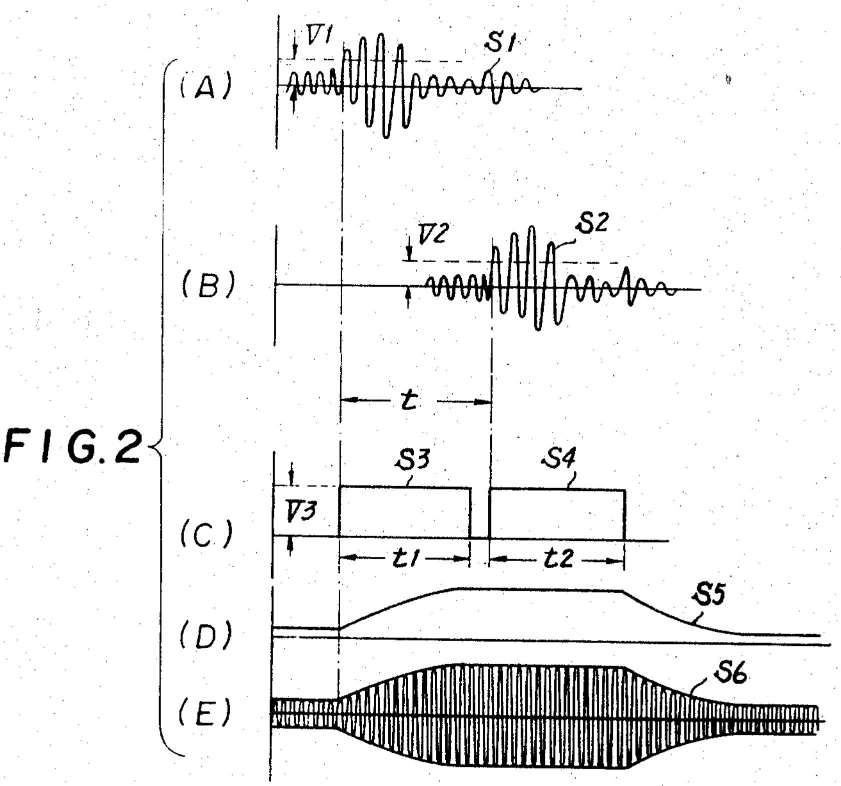

In FIG. 1, a master magnetic tape 10 has four channel signals already recorded separately in four tracks thereon, which are alligned parallel to each other. The magnetic tape 10 is driven and run by a capstan 11 and a pinch roller 12, in the direction of the arrow A. An auxiliary reproducing magnetic head group 13 and a main reproducing magnetic head group 14 are disposed along the path followed by the magnetic tape 10. The auxiliary head group 13 and the main head group 14 respectively comprise four auxiliary magnetic heads and four main magnetic heads for the four channels. These heads respectively make contact with the four channel tracks on the magnetic tape 10. The auxiliary head group 13 is disposed at a position which is spaced apart from the main head group 14 by the distance $l$ and is ahead of the main head group 14 in the advancing direction of the magnetic tape 10. The distance $l$ is selected at, for example, 65 mm. If this value is converted into time, it is 460 milliseconds when the magnetic tape 10 is run at a speed of 1/2.7 of the recording time.

The four channel signals are reproduced from the magnetic tape 10 by the auxiliary head group 13. The resulting signals are respectively supplied to reproducing equalizing amplifiers 15*a* to 15*d*. The signals are equalized and amplified in the amplifiers 15*a* to 15*d* and respectively adjusted in their levels in level adjusters 16*a* to 16*d*. Then, they are supplied to high-pass filters 17*a* to 17*d*. The high-pass filters 17*a* to 17*d* have a filtering characteristic which allows a signal over 8 KHz to pass and attenuates a signal below 8 KHz at a ratio of 12 dB/oct.

The reason for using the high-pass filters is that, even if the level of a low frequency component of the direct wave signal is high, the carrier component superposed thereon is not adversely affected. Whereas, if there is a high frequency component of a high level in the direct wave signal, the carrier component is adversely affected. Accordingly, it is necessary to take out the high frequency component for separately detecting the level of the high frequency component.

The middle and high frequency component signals filtered out of the high-pass filters are supplied through an OR gate 18, comprising diodes 18*a* to 18*d*, to a monostable multivibrator 19. The diodes 18*a* to 18*d* allow only a positive signal of a half cycle to pass, so as to prevent signals between the plurality of channels from cancelling each other when the signals are supplied to the single monostable multivibrator 19. The monostable multivibrator 19 operates when a signal exceecing a predetermined level comes in from at least one of the diodes 18*a* to 18*d*. The output square wave of the monostable multivibrator 19 is supplied to an integration circuit 20 where it is provided with a time constant characteristic. The output, having the time constant supplied by the integration circuit 20, is supplied as a control signal through a level adjuster 21 to control circuits 22*a* and 22*b*.

In the meanwhile, the signals of the first to fourth channels are reproduced by the main head group 14, with a delay time $t = l/v$, (where $l$ is the distance between the head groups 13 and 14, and $v$ is a running speed of the tape 10). Time $t$ is measured from the time of reproduction by the auxiliary head group 13. These four signals are amplified in reproducing equalizing amplifiers 23*a* to 23*d* and are respectively supplied, on one hand, to high-pass filters 25*a* to 25*d* and through level adjusters 24*a* to 24*d*. The signals are also respectively supplied, on the other hand, to matrix circuits 29*a* and 29*b*. The signals filtered in the high-pass filters 25*a* to 25*d* are supplied through an OR gate 26, comprising diodes 26*a* to 26*d*, to a monostable multivibrator 27. The output of the monostable multivibrator 27 is supplied to an integration circuit 28, in which a time constant is provided.

The output of the integration circuit 28 is mixed with the control signal from the integration circuit 20 and is supplied through the level adjuster 21 to the control circuits 22*a* and 22*b*. It is to be noted that the circuits extending from the level adjusters 24*a* - 24*d* to the control circuits 22*a* and 22*b* are of the same constructions as the circuits extending from the level adjusters 16*a* – 16*d* to the control circuits 22*a* and 22*b*.

In the meanwhile, the first to fourth channel signals CH1 to CH4 are supplied from the amplifiers 23*a* – 23*d* to matrix circuits 29*a* and 29*b*. In the matrix circuit 29*a*, a sum signal (CH1 + CH2) and a difference signal (CH1 – CH2) are formed with respect to the first and second channel signals CH1 and CH2. In the matrix circuit 29*b*, a sum signal (CH3 + CH4) and a difference signal (Ch3 – CH4) are formed with respect to the third and fourth channel signals CH3 and CH4. The difference signals (CH1 – CH2) and (CH3 – CH4) from the matrix circuits 29*a* and 29*b* are respectively supplied to phase modulators 30*a* and 30*b*, in which the signals are respectively phase modulated with a band width ranging from 20 KHz to 50 KHz. The phase modulated difference signals are supplied to the control circuits 22*a* and 22*b*, in which they are respectively controlled in the level of the carrier, responsive to the control signals from the integration circuits 20 and 28, as will be described later. The phase modulated difference signals having the controlled level of the modulated carrier are respectively supplied to mixers 31*a* and 31*b*. On the other hand, the sum signals (CH1 + CH2) and (CH3 + CH4), from the matrix circuits 29*a* and 29*b*, have a band width ranging from 30 Hz to 15 KHz. These signals are supplied to the mixers 31*a* and 31*b*, through delay circuits 32*a* and 32*b*. There the signals are made to coincide in time with the phase modulated difference signals.

A multiplex signal of the direct wave sum signal and the phase modulated difference signal, with respect to the first and second channel signals CH1 and CH2 mixed and multiplexed in the mixer 31*a*, is amplified in a recording amplifier 33*a*. Then, it is supplied to the left channel L side of a cutter head 34 of a cutting machine. Likewise, a multiplex signal of the direct wave sum signal, with respect to the third and fourth channels and the phase modulated difference signals with respect to the third and fourth channel signals CH3 and CH4 mixed and multiplexed in the mixer 31*b*, is amplified in a recording amplifier 33*b*. Then, it is supplied to the right channel R side of the cutter head 34.

These multiplex signals are cut and recorded on both side walls of a single 45—45 sound groove on the disc 35. At this time, the frequency of the direct wave sum signal is low (for example, 30 Hz to 15 KHz). Whereas, the frequency of the phase modulated difference signal is high (for example, 20 KHz to 50 KHz). Accordingly, the sound groove cut in the disc 35 has a waveform which consists of a relatively large waveform corresponding to the frequency of the direct wave sum signal and a relatively small waveform corresponding to the frequency of the phase modulated difference signal. The latter difference signal waveform is superposed upon the former waveform. Except for the control circuits 22*a* and 22*b*, the circuits in the block circuit extending from the amplifiers 23*a* 23*d* to the cutter head 34, via the matrix circuits 29*a* and 29*b* are described in detail in the U.S. patent application, Ser. No. 92,803 filed by the same applicant of the present application.

The operation of the essential part of the block diagram of the embodiment shown in FIG.1 will be described next together with the signal waveform diagram shown in FIG.2. In the following description of the operation for obtaining the control signal, the description is made only with regard to the signal reproduced from the head for the first channel. The circuit operation is the same with the second to fourth channel signals. The control signal is obtained when the level of at least one of the four channel signals exceeds a predetermined level.

First the head for the first channel, among the auxiliary head group 13, reproduces a signal S1 shown in FIG.2(A). Then the same signal as reproduced as a signal S2 by the corresponding head in the main head group 14, spaced apart from the auxiliary head group 13 by the distance *l*. Signal S2 lags behind the reproduced signal S1 by the time *t*, as shown in FIG. 2(B).

The monostable multivibrator 19 is set so that it operates at a level of V1, in response to the input signal S1. Likewise, the monostable multivibrator 27 is set so that it operates at a level of V2 (in the present embodiment, V1 = V2) in response to the input signal S2. Accordingly, when signal S1 reaches the level of the predetermined level V1, the monostable multivibrator 19 operates at that time position. A square wave signal S3, having a signal voltage V3 and a continuing time t1, is taken out as shown in FIG.2(C). Likewise, when signal S2 reaches the level of the predetermined level V2, the monostable multivibrator 27 operates at that time position. A square wave signal S4 having a signal voltage V3 and a continuing time t2, is the resulting output signal as shown in FIG.2(C). The continuing times t1 and t2 are selected so that they are equal to each other ($t1 = t2$) and slightly smaller than the delay time $t$ ($t1$, $t2 < t$).

The monostable multivibrator also functions to detect the predetermined level. Thus, it can operate accurately even in case there is a very short time interval during which the reproduced signals S1 and S2 exceed the predetermined level. In FIGS. 2(A) and (B), the periods of the signals S1 and S2 are enlarged for convenience of illustration. However, the frequencies of the signals S1 and S2 are in the order of KHz. The period of one cycle is very short, as compared with the times $t$, $t1$ and $t2$. The predetermined level V1 and V2, to be detected, are determined by the level adjustment of the input signals in the level adjusters 16*a* to 16*d* and 24*a* to 24*d*, as well as by a selection of the ratings of transistors used for the monostable multivibrators 19 and 27.

By the passage of the signals S3 and S4 in the integration circuits 20 and 28, a control signal S5 is obtained, as shown in FIG. 2(D). This signal has a voltage waveform which rises gradually with a relatively large time constant, continues at a constant level for a certain period of time, and then falls gradually with a relatively large time constant. Signal S5 is the mixed output of the integration circuits 20 and 28. As will be apparent from comparison of the signal S2 shown in FIG. 2(B) with the signal S5 shown in FIG.2(D), the signal S5 gradually rises before the high level portion of the signal S2 (the level portion exceeding the voltage V2) starts. The signal S5 has sufficiently risen at the time corresponding to the first portion of the high level portion of the signal S2. The signal S 5 continues its built-up state during a period of time which is sufficiently long to cover the period of time corresponding to the high level portion of the signal S2.

This control signal S5 is supplied to the control circuits 22*a* and 22*b* through the level adjuster 21. In the control circuits 22*a* and 22*b*, the carriers of the phase modulated difference signals having a constant amplitude because the phase modulators 30*a* and 30*b* are controlled in their levels by the control signal S5. A phase modulated difference signal S6, which has been controlled in its level of the carrier wave, is obtained from the control circuits 22*a* and 22*b*, with an envelope as shown in FIG.2(E).

In case the level of the reproduced signal from the magnetic tape 10 is higher than the predetermined level, the level of the direct wave sum signal becomes too high. Accordingly, the large waveform (due to the direct wave sum signal on the sound groove of the disc 35) becomes large, whereby a good cutting of the phase modulated difference signal becomes difficult. According to the invention, the level of the carrier of the phase modulated difference signal is controlled so as to become larger. This enables the superposed small waveform, due to the phase modulated difference signal, to also become larger thereby ensuring a good cutting and recording. Since the rising and falling of the envelope of the phase modulated difference signal (which has been controlled in the level of the carrier) has a gradual, sufficiently large time constant. Noise modulation does not occur during reproduction.

Nextly, the second embodiment of the system according to the invention will be described with reference to FIGS.3 to 6.

In FIG.3, the first and second channel signals CH1 and CH2 and the third and fourth channel signals CH3 and CH4 are respectively matrixed to form direct wave sum signals and phase modulated difference signals. These signals are superposed one upon the other and cut and recorded on the disc. This part of the system is the same as the system shown in FIG.1. Thus the illustration and description thereof is omitted (starting a new paragraph)--. A block diagram which is directly related to a carrier level control system, according to the present embodiment, will be illustrated and described. The first to fourth channel signals are reproduced from the preceding auxiliary head group 13. Then, they are respectively corrected in their frequency characteristics by frequency characteristic correction circuits 42*a* to 42*d*. The signals are properly adjusted in their levels by semi-fixed variable resistors 43*a* to 43*d*. Then, they are supplied to amplifiers 44*a* to 44*d*. Each channel signal is amplified in each of the amplifiers 44*a* to 44*d* and then is supplied to high pass filters 45*a* to 45*d*, in which high frequency signal components are filtered out. The filtered high frequency signal component is properly attenuated in its level, by variable resistors 46*a* to 46*d*. Then, the signal is amplified in amplifiers 47*a* to 47*d* and applied to an OR gate 48 comprising diodes 48*a* to 48*d*. The signals which have passed through the OR gate 48 are respectively supplied to a delay circuit 49. Accordingly, when the signal passes one of the diodes 48*a* to 48*d* of the gate circuit 48, an input signal is supplied to the delay circuit 49.

The delay circuit 49 is adapted to form a signal which has a voltage rising responsive to the coming of the input signal. This formed signal has a continuing time during which its falling characteristic is prolonged for a constant period of time. The voltage signal formed in the delay circuit 49 is supplied to a time constant circuit 50, provided in a next stage. The voltage signal is integrated and given a time constant in this circuit.

Figure 4:
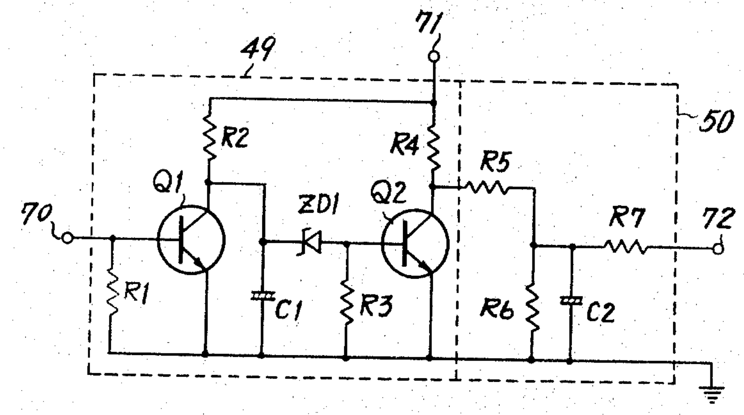
FIGS.4 and 5 are, respectively, circuit diagrams showing embodiments of electric circuits for use in the essential parts of the block diagram shown in FIG.3.

One concrete embodiment of the electric circuit of the delay circuit 49 and the time constant circuit 50 is shown in FIG. 4. Assume that a signal has too high a level (shown in FIG.6(A)) in either one of the first to fourth channel signals. For example, the first channel, a signal S1 shown in FIG.6(A), is reproduced from the auxiliary head 13 ahead of a reproduced signal S2 reproduced from the main head 14 shown in FIG.6(B). The lead is the time $t$. The signal, which has passed the gate circuit 48*a*, is applied from a terminal 70 to the base of a transistor Q1 of the delay circuit 49, to make it a conductive state.

A voltage signal S7, having a continuing time t3, appears at the collector of the transistor Q1 as shown in FIG.6(C). A resistor R2 is connected between the collector of the transistor Q1 and a terminal 71, to which a voltage E is applied. A capacitor C1 is connected between the collector and the ground. The base of a transistor Q2 is connected through a Zener diode ZD1 to the collector of the transistor Q1. The transistor Q2 is made conductive by the signal S7. A signal S8, having a continuing time ($t3 + t4$), is developed at the collector of the transistor Q2 as shown in FIG.6(D). The time $t4$ which is added to the time t3 is given by the following equation;

$$t4 = C1 \cdot R2 \cdot \log_n \frac{1}{1-\frac{E_z}{E}}$$

where: C1 designates the capacitance of the capacitor C1; R2 the resistance of the resistor R2; $E_z$ the voltage of the Zener diode ZD1; and E the voltage applied to the terminal 71, respectively.

In a time constant circuit 50, resistors R5 and R7 are connected between the collector of the transistor Q2 and a terminal 72. A resistor R6 and a capacitor C2 are connected in parallel between the junction of the resistor R5 and the resistor R7 and the ground. The signal S8, which has appeared at the collector of the transistor Q2, is integrated in an integration circuit comprising the resistor R5 and the cpacitor C2, where it is provided with a time constant.

Accordingly, a signal S9 having rising and falling characteristics, as shown in FIG.6(E), is developed at the terminal 72. This signal S9 is used as a control signal at a later time. This signal S9 comprises a rising portion having a time $t5$, a constant portion having a time $t6$, and a falling portion having a time $t7$. The time constants of these rising and falling portions are determined by the time constant of the integration circuit in the time constant circuit 50. The aforementioned time constant is selected to satisfy conditions $t6 = t3$, and $t5 = t7 = t$. The large time constants which are control signal S9 has in its rising and falling portions cause an operation of the limiter stage of an apparatus for reproducing the disc to become smooth and prevent fluctuation of the level of the carrier from interfering with the direct wave sum signal.

The output control signal S9 of the time constant circuit 50, obtained from the terminal 72, is supplied through a variable resistor 51 shown in FIG.3. This resistor provides for adjusting the range of control. Signal S9 passes from resistor S1 through a diode 52, and appears at a point 53. In the meanwhile, a positive DC voltage, from a terminal 54, is applied through a voltage stabilizing circuit 55 and a diode 56 to the point 53 as a bias voltage. The diodes 52 and 56 are connected in opposite polarities with respect to each other so as to prevent a flow of electric current in a reverse direction. This bias voltage is applied for reducing the distortion factor in the control system and stabilizing the operation. The control signal voltage developed at the point 53 is superposed upon the bias voltage and applied simultaneously to control element circuits 57 and 58.

A phase modulated difference signal is obtained in the same manner as in the first embodiment, from the first and second channel signals CH1 and CH2 which are reproduced by the heads among a main head group. The reproduced signal is supplied from a terminal 59 to a control circuit 60 on the side of the first and second channels (hereinafter referred to as a left channel side). Likewise, with regard to the side of the third and fourth channels (hereinafter referred to as a right channel side), a phase modulated difference signal of the third and fourth channel signals CH3 and CH4 is supplied from a terminal 63 to a control circuit 64. The left channel phase modulated difference signal is controlled in the level of its carrier in the control circuit 60, in response to the control element circuit 57 to which the control voltage is applied from the point 53. This left channel signal is obtained from an output terminal 62, through a level adjuster 61. The same is the case with the right channel side. The right channel phase modulated difference signal, which has been controlled in the level of its carrier in the control circuit 64, is obtained from an output terminal 66, through a level adjuster 65.

Figure 5:
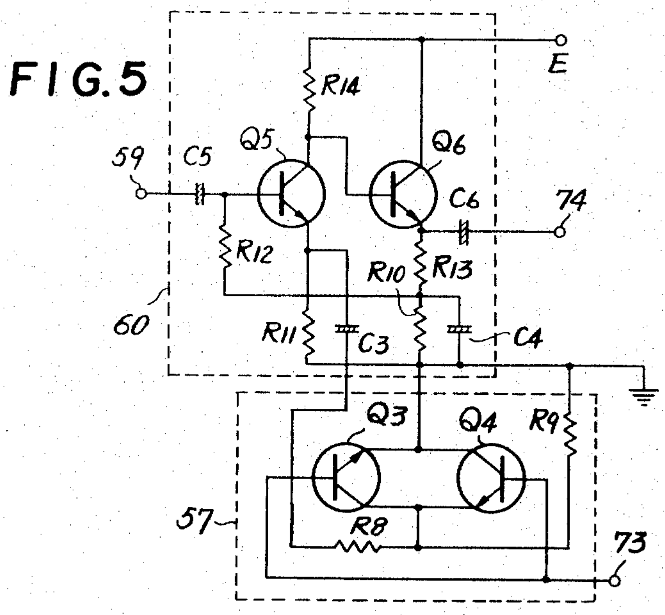
Figure 6:
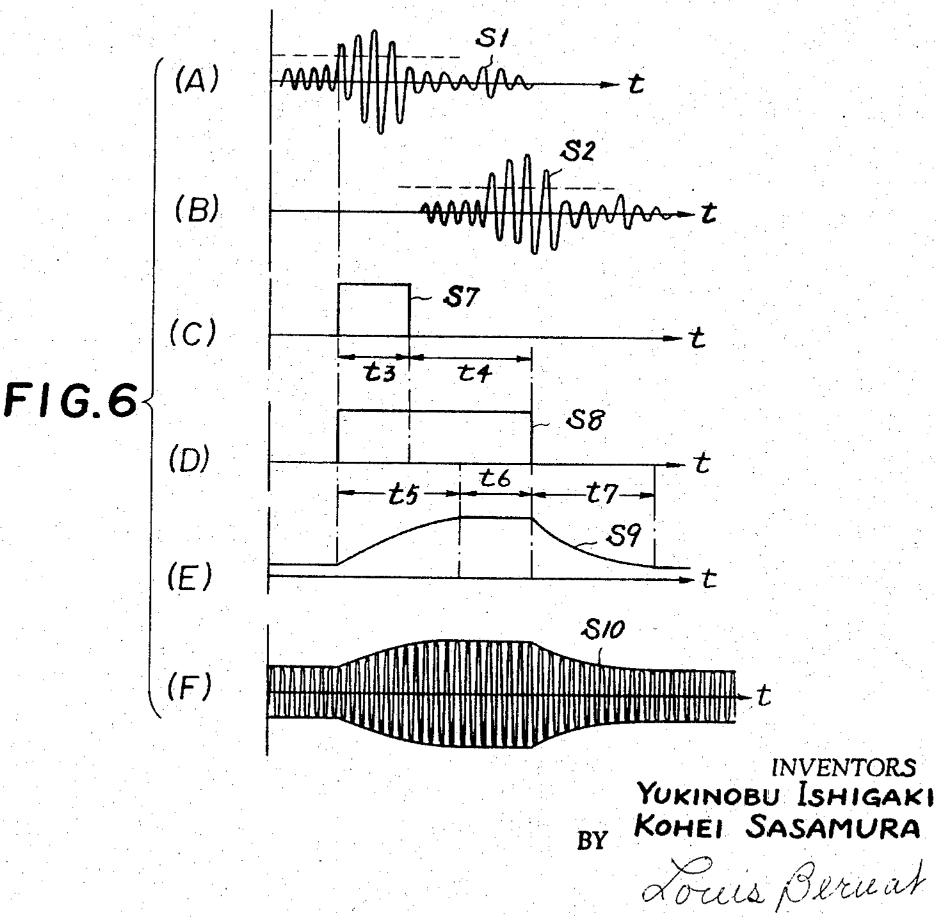

One concrete embodiment of the control element circuit 57 and the control circuit 60 is shown in FIG.5. The control element circuit 58 and the control circuit 64 are of the same circuit construction, as the aofrementioned circuits thus, the illustration and description thereof are omitted.

The control signal voltage and the bias voltage at the point 53, shown in FIG.3, are applied through an input terminal 73 of the control element circuit 57, shown in FIG.5, to the bases of transistors Q3 and Q4. The connecting point of the emitter of the transistor Q3 and the collector of the transistor Q4 is grounded. The connecting point of the collector of the transistor Q3 and the emitter of the transistor Q4 is connected through a capacitor C3 to the emitter of a transistor Q5 in the control circuit 60. The bias voltage is always applied to the bases of the transistors Q3 and Q4 from the terminal 73, when no control signal is applied thereto. The transistors Q3 and Q4 respectively have internal resistances between their collectors and emitters. Accordingly, when the control signal S9 is applied to the bases of the transistors Q3 and Q4, the internal resistance in each transistor is changed. This change in the internal resistance causes a variation in the amplification degree of an amplifying transistor Q5. Accordingly, the phase modulated difference signal input from the terminal 59 is controlled in the level of its carrier in response to the control signal S9. This control occurs in the circuit leading to an output terminal 74, via the transistors Q5 and Q6. A phase modulated difference signal S10, which has been controlled in its envelope as shown in FIG.6(F), is obtained from the terminal 74.

According to the system of the present embodiment, the control signal S9 appears at the point 53 when any one of the first to fourth channel signals exceeding a predetermined level is simultaneously applied to the control element circuits 57 and 58. Signal S9 simultaneously controls the left channel side phase modulated difference signal and the right channel side phase modulated difference signal. Consequently, the sound groove on the disc, on which these signals are recorded, has no unbalance between the shape of the two walls, but both walls have the same shape. Therefore, the signals are reproduced from this disc with an equal signal to noise ratio for both the left and right channels. Further, both the disc and the reproducing stylus have a longer life. Furthermore, a tracing distortion and a phase modulating interference with the carrier, with respect to a radius of curvature of the reproducing stylus, are reduced. A cross modulation distortion between the left and right channels and a crosstalk are still further reduced.

In the foregoing embodiment, however, the level of the carrier of the phase modulated difference signal is variable only in one stage relative to the variation of the level of the direct wave sum signal, namely in case the level of the reproduced signal exceeds a certain predetermined level and it is below the predetermined level. Consequently, when the level of the reproduced signal fluctuates slightly near a middle level, the level of the carrier of the phase modulated difference signal is controlled in one point and not controlled in other point. This causes instability in the operation of the system.

The third embodiment of the system according to the invention will be described with reference to FIGS.7 to 11. In FIG.7, the four channel signals are reproduced, by the auxiliary magnetic head group 13 from the master magnetic tape 10. The signals are equalized and amplified in reproducing equalizing amplifiers 80*a* to 80*d* and supplied to high-pass filters 81*a* to 81*d*. High frequency components filtered out of the high-pass filters 81*a* to 81*d* are set in their levels in attenuators 82*a* to 82*d*, amplified in flat amplifiers 83*a* to 83*d*, and then supplied to delay circuits 84 and 85.

One embodiment of a concrete electric circuit from the equalizing amplifier 80*a* to the flat amplifier 83*a* is shown in FIG.8. The circuits for the second to fourth channels are entirely the same as the circuit for the first channel. Thus, the illustration and description thereof will be omitted.

The reproduced signal from the auxiliary head group 13 is received from an input terminal 100 (FIG.8) and is stepped up by about 20 dB in a step-up transformer 101. The stepped up signal is applied to the base of a transistor Q7. Transistors Q7 and Q8 comprise an equalizing and amplifying circuit provided with a feedback circuit of a NAB characteristic. Values of resistors R15 and R16, a variable resistor VR1 and a capacitor C7 are selected so that the values become $(R16 + VR1)C7 = 3180\ (\mu sec) \times 2.7$ in low frequencies and $R15.C7 = 50\ (\mu sec) \times 2.7$ in high frequencies. The coefficient 2.7 is based on the fact that the rotation of the disc during cutting and recording is 1/2.7 of the rotation during reproduction. Transistors Q9 and Q10 function both as a flat amplifying circuit and an impedance converting circuit. The high-pass filter comprises resistors R17 and R18, capacitors C8 and C9 and inductance L1 and L2. In the present embodiment, a cutoff frequency of the high-pass filter is selected to be at 8 KHz/2.7. A flat amplifier 83*a* comprises transistors Q11 and Q12. The amplification degree of the amplifier 83 is determined by a feedback resistor R19 connected between the collector of the transistor Q12 and the emitter of the transistor Q11 and by an emitter resistor R20 of the transistor Q11. The output reference level is set at +2dB.

The signals from the amplifiers 83*a* to 83*d* pass through an OR gate 84 comprising diodes 84*a* to 84*d*. From there the signal is simultaneously supplied to first and second delay circuits 85 and 86. The first delay circuit 85 is operated by an input signal having a level which is higher than a first predetermined level at the low side of the high level. The second delay circuit 86 is operated by an input signal having a level which is higher than a second predetermined level above the first predetermined level. First and second delay signals are respectively obtained from these first and second delay circuits 85 and 86. The output of these first and second delay signals are added together and supplied simultaneously to an integration circuit (time constant circuit) 87.

One embodiment of a concrete electric circuit of the OR gate 84, the delay circuits 85 and 86 and the integration circuit 87 is shown in FIG.9. The delay circuits 85 and 86 are substantially the same in principle as the delay circuit 49 shown in FIG.4.

The first to fourth channel signals appear at the input terminals 110*a* to 110*d*, and are respectively applied through Zener diodes ZD2 to ZD5 to the base of a transistor Q13 in the first delay circuit 85. The transistor Q13 operates when a signal S1, shown in FIG.11(A), which has been reproduced by the auxiliary head group 13, exxceeds a predetermined level V4. Responsive thereto, an output signal S11, shown in FIG.11 (C), appears at the collector transistor Q13. This signal S11 is applied to the base of a transistor Q14, through a Zener diode ZD10. From the collector of the transistor Q14, a signal S13 shown in FIG.11 (E) is obtained. The signal S13 has a delayed and extended continuing time which is determined by a time constant of a resistor R25 and a capacitor C18, the voltage of the Zener diode ZD10 and voltage (*V*cc1) applied to a terminal 111, to which the resistor R25 is connected.

In the meanwhile, the first to fourth channel signals from the input terminals 110*a* to 110*d* are applied through variable resistors VR2 to VR5, which are provided for level adjustment. Zener diodes ZD6 to ZD9 apply these signals to the base of a transistor Q16 in the second delay circuit 86. Since the input signals to the transistor Q16 are attenuated in the variable resistors VR2 to VR5, the transistor Q16 operates only when the level of the signal S1 exceeds the second predetermined level, which is higher than the level V4. An output signal S12, shown in FIG.11 (D), appears at the collector of transistor 216. This signal S12 is applied, as the signal S13 to control transistor Q17. From transistor Q17, a signal S14 is produced having a delayed and extended time period as shown in FIG.11(F).

The signals S13 and S14 are obtained from the transistors Q14 and Q17 and pass through transistors Q15 and Q18, respectively. Transistors Q15 and Q18 comprise a waveform converting circuit and an inverting circuit. Their outputs are added together at a point 112 to be made into a superposed signal S15, as shown in FIG.11(G). This signal S15 is supplied to a Miller integrator comprising a transistor Q19, a resistor R39 and a capacitor C20. The signal S15 is integrated in the Miller integrator and made into a signal S16 as shown in FIG.11(H). This signal has a time constant which is determined by a resistor R39 and a capacitor C20. The signal S16 is taken out from an output terminal 113.

The control signal which varies in two steps according to the level of the input signal from the integration circuit 87 (FIG.7), is applied to the point 53 via the diode 52, and thence to the control element circuits 57 and 58, together with a bias voltage applied from the terminal 54 through the voltage stabilizing circuit 55 and the diode 56. As in the second embodiment, the left channel side and the right channel side phase modulated difference signals are supplied from terminals 59 and 63. These signals are respectively and simultaneously controlled in the levels of their carriers in control circuits 60 and 64, responsive to the control signal S16, and a signal S17 This signal S17 has an envelope, the level of which has been controlled in two steps as shown in FIG.11(1), responsive to the level of the signal S1. Signal S17 is obtained from terminals 62 and 66.

One embodiment of the control element circuit 57 and the control circuit 60 is shown in FIG.10. This circuit is substantially similar to the circuit shown in FIG.5. The control signal S16 and the bias voltage from a terminal 120 are applied through resistors R50 and R51 to the bases of transistors Q22 and Q23. The collectors of the transistors Q22 and Q23 are connected respectively to the emitter of an amplifying transistor Q20 through resistors R52 and R53 and a capacitor C25. The amplification degree of the transistor Q20 varies due to variation of the internal resistance of the transistors Q22 and Q23, responsive to the control signal S16. Accordingly, the left channel phase modulated difference signal supplied from the terminal 59 is controlled in its level in the transistor Q20, in response to the control signal S16. This controlled signal S17 is obtained from the output terminal 62, and supplied through a transistor Q21.

According to this embodiment, the level of the phase modulated difference signal is controlled in two steps, in accordance with the variation in the level of the input signal S1. Accordingly, this embodiment is capable of controlling the level accurately so that it corresponds to the variations in the level of the direct wave signal. In the previously described embodiment, the level control is made only in one step. Although, in the present embodiment, the level control is made in two steps, a level control in three or more steps can be made for a more smoother control. This is done by providing three or more delay circuits which respectively operate at levels which are different from each other.

As the level adjuster (attenuator) 51, a circuit shown in FIG. 12 may be used instead of a variable resistor in which a value of resistance varies continuously. Resistors 131, 132 and 133 are connected in series between a resistor 130 connected to the integration circuit 50 (87) and the ground. Contacts 136, 137 and 138, can be selectively connected to a movable contact 135 of a switch. These contacts are respectively connected to the junction points between resistors 130 and 131, resistors 131 and 132, and resistors 132 and 133. A contact 139 is connected to a resistor 134, which is connected between the resistor 133 and the ground. The movable contact piece 135 is connected to diodes **52*a* and 52*b*.**

When the contact piece 135 is switched between the contacts 136, 137 and 138, in sequence, a resistor having a value of resistance which is either that of the resistor 130, the sum of the value of resistance of the resistors 130 and 131, the sum of the values of the resistance of the resistors 130, 131 and 132, and the sum of the values of resistance of the resistors 130, 131, 132 and 133 is inserted between the integration circuit 50 (87) and the diodes **52*a* and 52*b*. When the contact piece 135 is connected to the contact 139, the control signal does not pass through the contact piece 135. The resistor 134 is provided for avoiding fluctuation of the value of voltage at the points 53*a* and 53*b*. This fluctuation occurs due to a reverse current flowing from the points 53*a* and 53*b* through the diodes 52*a* and 52*b*.**

Accordingly, the attenuation degree of the control signal supplied from the integration circuit 50 (87) to the control element circuits 57 and 58 (via diodes **56*a* and 56*b*) is selected by switching the contact piece 135 of the switch to the desired contact among the contacts 136 to 139.**

In the present embodiment, the control element circuit 57 is controlled by the control signal voltage supplied from the switch 135 through the diode **52*a* by the bias voltage supplied from the stabilizing circuit 55 through the diode 56*a*. Whereas the control element circuit 58 is controlled by the control signal voltage supplied from the switch through the diode 52*b* and by the bias voltage supplied from the stabilzing circuit 55 through the diode 56*b*. Accordingly, interference between the control element circuits 57 and 58** can be prevented.

Further, this invention is not limited to these embodiments but various variations and modifications may be made without departing from the scope and spirit of the invention.

What we claim is:

1. A multiplex channel disc recording system comprising means for supporting a magnetic tape for running in one direction, the signals of a plurality of channels being recorded on said tape, means comprising a first reproducing magnetic head group for respectively reproducing said recorded channel signals from said magnetic tape, means comprising a second reproducing magnetic head group for reproducing said recorded signals from said magnetic tape, said second head group being disposed a predetermined position ahead of said first reproducing magnetic head group with respect to the running direction of said magnetic tape, whereby said first head reproduces said recorded signal a fixed time period after said second head reproduces them, means for angle modulating a carrier responsive to the signal obtained from the first reproducing magnetic head group, level detecting means for detecting signals exceeding a predetermined signal level reproduced from said second reproducing magnetic head group, generating means responsive to said detected signals for generating an output signal, time constant circuit means for obtaining a control signal responsive to the output of said signal generating means, said control signal having a waveform which gradually rises with a time constant which greatly exceeds said fixed time period, said control signal having a control level when the level of the signal reproduced by said second reproducing magnetic head group exceeds the predetermined signal level, means for controlling the level of the modulated carrier of the angle modulated wave responsive to the control level of control signal of said time constant circuit means, mixing means for mixing and multiplexing a direct wave signal obtained from the signal reproduced by said first reproducing magnetic head group with the angle modulated wave which has been controlled in the level of the modulated carrier, and means for cutting and recording the output multiplexed signal of said mixing means on a record disc.

2. The multiplex channel disc recording system as defined in claim 1 in which said level detecting means comprises a delay circuit for obtaining a signal which rises when an input signal of a level exceeds a predetermined level and which has a continuing stable time followed by a delayed and extended falling characteristic.

3. The multiplex channel disc recording system as defined in claim 1 in which said level detecting means comprises at least first and second level detecting circuits, said first level detecting circuit producing an output when the reproduced input signal from said second reproducing magnetic head group exceeds a first predetermined level, said second level detecting circuit producing an output when the reproduced input signal from said first reproducing magnetic head group exceeds a second predetermined level which is higher than said first predetermined level, and said control signal causing a voltage waveform which controls the level of said modulated carrier in at least two steps, with a time constant, in response to the output signals of said first and second level detecting circuits.

4. The multiplex channel disc recording system as defined in claim 1 in which the signals of four channels are recorded on said magnetic tape, said angle modulating means comprising a first angle modulator means which angle modulates the carrier responsive to signals obtained from the first and second channel signals reproduced from said first reproducing magnetic head group and a second angle modulator means which angle modulates the carrier responsive to signal obtained from the third and fourth channel signals, and said control circuit means comprising a first control circuit means for controlling the level of the carrier of the angle modulated wave from said first angle modulator and a second control circui means for controlling the level of the carrier of the angle modulated wave from said second angle modulator.

5. The multiplex channel disc recording system as defined in claim 4 in which said first and second control circuits means are simultaneously supplied with control signals from said time constant circuit to simultaneously control the level of the carrier of the respective input angle modulated wave.

6. The multiplex channel disc recording system as defined in claim 1 which further comprises a second level detecting means for producing an output signal when the level of the signal reproduced by said first reproducing magnetic head group exceeds a predetermined signal level, and a second time constant circuit means for providing a signal with a rising and falling characteristic with a predetermined time constant which exceeds said fixed time period, means responsive to said second level detecting means for controlling the level of the modulated carrier responsive to a further control signal generated in response to the outputs of said first and second time constant circuit means, said further control signal having a voltage waveform which gradually rises with a suitable time constant, to a high control level when the level of the reproduced signal from said second reproducing magnetic head group exceeds the predetermined signal level, thereafter said control signal continuing to increase at least to the level of said modulated carrier while the level of the reproduced signal from said first reproducing magnetic head group is above the predetermined level and thereafter said further control signal falling gradually.

7. The multiplex channel disc recording system as defined in claim 6 in which said first and second level detecting means are monostable multivibrators, means for operating said multivibrators responsive to an input signal having a level exceeding the predetermined level applied thereto, said monostable multivibrator producing an output with a predetermined time width.

8. A system for recording multiplex channel signals on a record disc, said system comprising:

a. means for moving a magnetic tape in one direction, signals for four channels being pre-recorded on said magnetic tape;

b. means including a first magnetic head group for respectively reproducing the recorded four channel signals from said magnetic tape;

c. means including a second magnetic head group for respectively reproducing the recorded four channel signals from said magnetic tape, said second magnetic head group being disposed at a predetermined position ahead of said first magnetic head group with respect to the running direction of said magnetic tape;

d. two matrix means for respectively matrixing each two of the four channel signals reproduced by said first magnetic head group to form two channel sum signals and two channel difference signals;

e. two modulator means for angle modulating a carrier in response to the respective output difference signals of said matrix means;

f. first OR gate means for producing a first output signal in response to some of the signals reproduced by said second magnetic head group, the levels of which some exceed a first predetermined level;

g. second OR gate means for producing a second output signal in response to some of the signals reproduced by said first magnetic head group, the levels of which some exceed a second predetermined level;

h. first means responsive to said first output signal for producing a first pulse signal having a width which is greater than the width of said first output signal;

i. second means responsive to said second output signal for producing a second pulse signal having a width which is greater than the width of said second output signal;

j. first integrating means for integrating said first pulse signal with a time constant to produce a first waveform signal which rises and falls gradually;

k. second integrating means for integrating said second pulse signal with the time constant to produce a second waveform signal which rises and falls gradually;

l. means responsive to a superposed signal comprised of the first and second waveform signals for simultaneously controlling the levels of the output modulated carriers of said two modulator means;

m. two mixing means responsive to said level controlling means for respectively mixing and multiplexing the angle modulated carriers and the corresponding output sum signals from said matrix means; and n. means for cutting and recording the output multiplex signals from said two mixing means on a record disc.

9. A system for recording multiplex channel signals on a record disc, said system comprising:

a. means for transporting a magnetic tape in one direction, signals of four channels being prerecorded on said magnetic tape;

b. means including a first magnetic head group for respectively reproducing the recorded four channel signals from said magnetic tape;

c. means including a second magnetic head group for respectively reproducing the recorded four channel signals from said magnetic tape, said second magnetic head group being disposed at a predetermined position ahead of said first magnetic head group with respect to the running direction of said magnetic tape;

d. two matrix means for respectively matrixing each two of the four channel signals reproduced by said first magnetic head group to form a sum of two channel signals and a difference of two channel signals;

e. two modulator means for angle modulating a carrier in response to the respective output difference signals of said matrix means;

f. OR gate means for producing an output signal in response to some of the signals reproduced by said second magnetic head group, the levels of which some exceed a predetermined level;

g. means responsive to the output signal of said OR gate means for producing a pulse signal, the width of which is greater than the width of the output signal of said OR gate means;

h. integrating means for integrating said pulse signal to form a waveform signal which rises gradually, keeps a flat level, and thereafter falls gradually;

i. means responsive to said waveform signal for simultaneously controlling the levels of the output modulated carriers of said two modulator means;

j. two mixing means responsive to said level controlling means for respectively mixing and multiplexing the angle modulated carriers and the corresponding output sum signals for said matrix means; and k. means for cutting and recording the output multiplex signals from said two mixing means on a record disc.

10. The system as defined in claim 9 wherein said OR gate means produced another output signal in response to some of the signals reproduced by said second magnetic head group, the levels of which exceed another predetermined level larger than said predetermined level, said pulse signal producing predetermined level and thereafter said further control signal falling gradually.

11. The system as defined in claim 10 wherein said first predetermined level is substantially the same as said second predetermined level.

* * * * *